(12) United States Patent
Mayers, Sr. et al.

(10) Patent No.: US 8,540,856 B1
(45) Date of Patent: *Sep. 24, 2013

(54) HYDROGEN GENERATOR AND METHOD FOR THE PRODUCTION OF HYDROGEN

(76) Inventors: Fred T. Mayers, Sr., Chester, VA (US); Edward N. Miller, Glen Allen, VA (US); Fred T. Mayers, Jr., Chester, VA (US)

( * ) Notice: Subject to any disclaimer, the term of this patent is extended or adjusted under 35 U.S.C. 154(b) by 459 days.

This patent is subject to a terminal disclaimer.

(21) Appl. No.: 12/925,262

(22) Filed: Oct. 18, 2010

Related U.S. Application Data

(63) Continuation-in-part of application No. 12/584,617, filed on Sep. 9, 2009, now Pat. No. 7,837,842.

(51) Int. Cl.
*C25B 9/10* (2006.01)
*C25B 9/18* (2006.01)
*C25B 1/10* (2006.01)

(52) U.S. Cl.
USPC ........... 204/260; 204/265; 204/266; 205/628; 205/637

(58) Field of Classification Search
USPC ................ 204/260, 265, 266; 205/628, 637
See application file for complete search history.

(56) References Cited

U.S. PATENT DOCUMENTS

| | | | |
|---|---|---|---|
| 4,256,060 A | 3/1981 | Kelly | |
| 4,597,363 A | 7/1986 | Emelock | |
| 5,231,954 A | 8/1993 | Stowe | |
| 6,209,493 B1 | 4/2001 | Ross | |
| 7,191,737 B2 | 3/2007 | Klein | |
| 2004/0170810 A1* | 9/2004 | Rasmussen | 428/174 |
| 2008/0060937 A1* | 3/2008 | Molter et al. | 204/279 |

* cited by examiner

*Primary Examiner* — Nicholas A Smith

(57) ABSTRACT

An apparatus and method for generating hydrogen. The hydrogen generator of the present invention includes a closed body having a sidewall and two end plates defining a cavity therein. A plurality of electrodes and a plurality of proton exchange membranes are disposed within the cavity. Each proton exchange membrane is sandwiched between two electrodes thereby creating a plurality of hydrogen generating cells disposed along the inner wall of the sidewall. An inflated bladder insures intimate contact between the electrodes and proton exchange membranes. The hydrogen generating cells are operated in series by applying a DC voltage of opposite polarity to electrodes at opposing ends of the cells. Applying the voltage and admitting water into the generator enables hydrogen generation at 12 volts or higher while limiting the potential on each proton exchange membrane to 2 volts thereby protecting the proton exchange membranes from damage or failure by voltage overload.

20 Claims, 16 Drawing Sheets

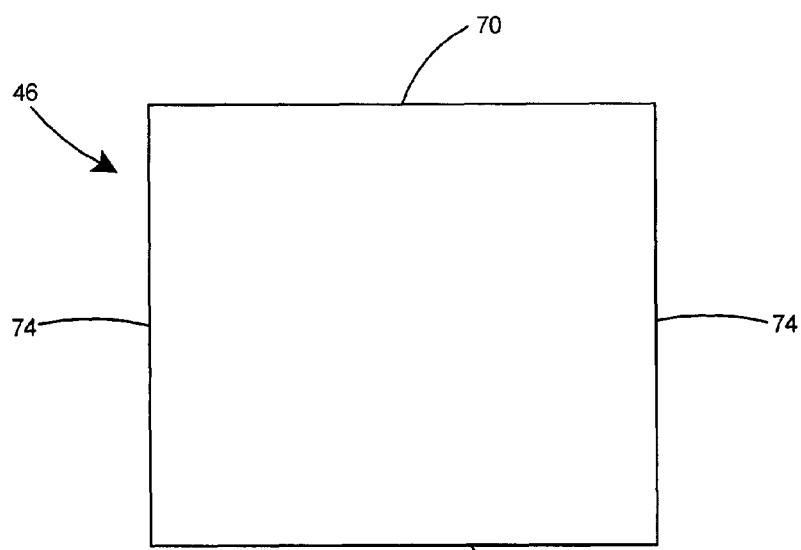
Fig. 9
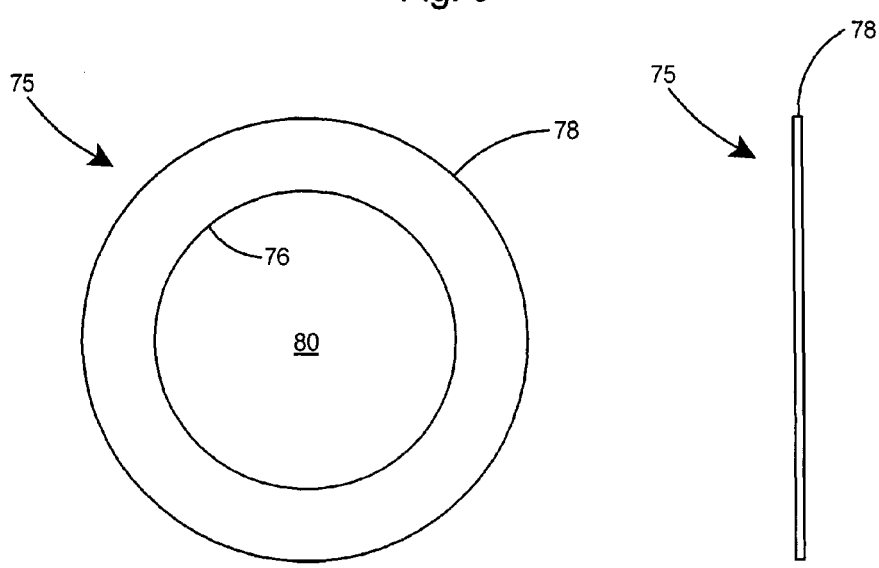 
Fig. 10      Fig. 11

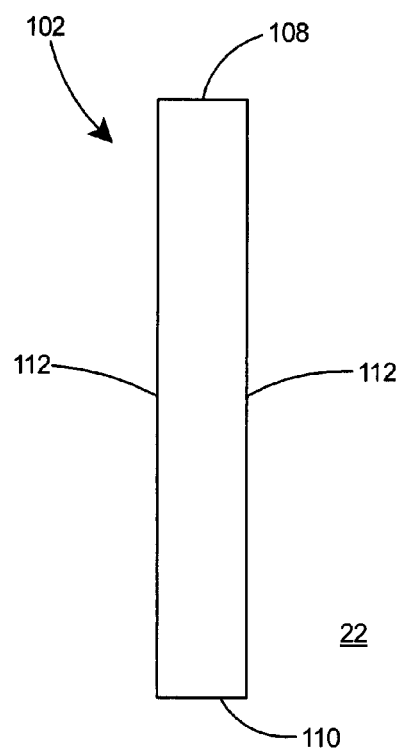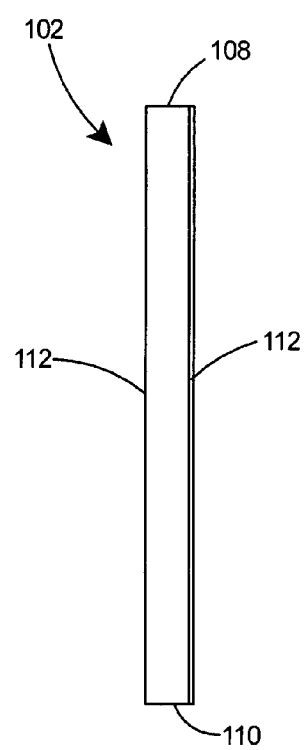
Fig. 16                          Fig. 17
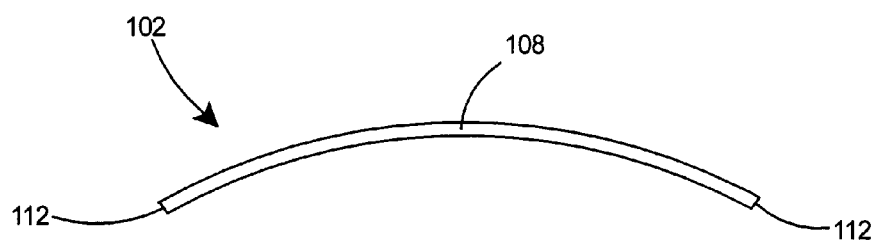
Fig. 18

HYDROGEN GENERATOR AND METHOD FOR THE PRODUCTION OF HYDROGEN

This application is a Continuation-In-Part of U.S. patent application Ser. No. 12/584,617, filed on Sep. 9, 2009, now U.S. Pat. No. 7,837,842, and entitled "Hydrogen Generator and Method for the Production of Hydrogen", of which the entire contents of said application is incorporated herein in its entirety by reference thereto.

FIELD OF THE INVENTION

This invention relates to generating hydrogen and specifically to an apparatus and method for generating hydrogen using a fuel cell.

BACKGROUND OF THE INVENTION

The production of hydrogen is important as there is now an emphasis to accelerate the establishment of a hydrogen economy to reduce the production of greenhouse gases. Hydrogen production on a small scale will be important for powering vehicles. A common method for small scale production of hydrogen is electrolysis. Electrolysis involves using an external voltage applied to an electrolytic cell to decompose water into hydrogen and hydroxide. The electrolytic cell typically includes an electrolyte and two electrodes. The electrolyte is usually a solution of water in which ions are dissolved. One problem with electrolytic cells is that the electrolyte is typically a corrosive liquid and care must be taken to contain the electrolyte and ensure that the electrolytic cell is safe to handle and operate.

A fuel cell offers a safer alternative to the use of electrolytic cells for the production of hydrogen. The fuel cell can be run in reverse to provide hydrogen fuel. Fuel cells are typically constructed as a fuel cell stacks that include a plurality of fuel cells stacked one upon the other and held in compression with respect to one another. The plurality of stacked fuel cells held in a compressive state form a fuel cell assembly. Each fuel cell includes a cathode layer, an anode layer, and an electrolyte disposed between the cathode layer and the anode layer. The fuel cell assembly requires a substantial amount of compressive force to hold the fuel cells of the assembly together. Prior art fuel cell stack structures typically use rigid end plates to impart and maintain a compressive force on the fuel cell assembly. Typically, ties rods extend through the end plates to impart a compressive force on the end plates and maintain the end plates in a spaced relationship.

Several problems arise as a result of maintaining a typical fuel cell assembly comprised of stacked fuel cells in a compressive relationship. As a result of the high compressive force that must be maintained on the fuel cell assembly, the rigid end plates have a tendency to deflect and not impart a uniform compressive force over the entire fuel cell assembly. The force applied over the central portion of the fuel cell assembly is typically not as great as the force applied to the periphery of the fuel cell assembly. Furthermore, the stacking of a plurality of fuel cells adds complexity to the overall design of the assembly and contributes to the difficulty of maintaining an even compressive force throughout the active area of each fuel cell within the stack.

What is needed therefore, is an apparatus and method for the production of hydrogen that reduces the complexity of the stacked fuel cell assembly and that applies a substantially uniform compressive force along the active area of the fuel cell assembly without requiring excessively thick end plates or the use of augmenting means for applying a uniform compressive force to the central portions of the fuel cells within the assembly. The apparatus for the safe production of hydrogen should be compact enough to be easily mounted singly or in a series configuration on a conventional vehicle with an internal combustion engine in order to provide an alternative fuel source for the vehicle and alternatively combined in any number of modules to provide commercial quantities for use in supplying hydrogen to power fuel cells. The apparatus for production of hydrogen could also be used in homes or businesses to supply hydrogen in place of natural gas.

The parent application U.S. Ser. No. 12/584,617, now U.S. Pat. No. 7,837,842, disclosed a hydrogen generator that produced the several benefits described hereinabove. The present application discloses a preferred embodiment that enables construction and operation of a compact hydrogen generator at higher voltages, such as 12 volt operation that would be applicable to use in many motor vehicles.

SUMMARY OF THE INVENTION

The present invention is directed to an apparatus and method for generating hydrogen. The hydrogen generator of the present invention includes a closed body including a sidewall and two end plates defining a cavity therein. Several elements are disposed within the cavity including a plurality of electrodes and a plurality of proton exchange membranes. The elements are arranged such that each proton exchange membrane is sandwiched between two electrodes thereby creating a plurality of hydrogen generating cells disposed along the inner wall of the sidewall. An inflated bladder disposed within the cavity and inside the elements creates intimate contact between the electrodes and proton exchange membranes. A rubber gasket and an end plate are disposed at each end of the body and are held in a rigid spaced and compressed relationship with respect to the body. Ports are provided to enable fluid and gas flow into or out of the closed body including ports for water and oxygen exit, hydrogen exit, water inlet. An electrical terminal is wired to an electrode at each end of the hydrogen generating cells. Applying DC voltage of opposite polarity to each electrical terminal and admitting water into the water inlet enables hydrogen production at each of the cells. The multiple cell construction enables hydrogen generation at 12 volts or higher, depending on the amount of cells disposed within the closed body.

OBJECTS AND ADVANTAGES

Several advantages are achieved with the hydrogen generator apparatus and method of the present invention, including:
 (1) The hydrogen generator provides a simple and compact apparatus for producing hydrogen from water.
 (2) The fuel cell based hydrogen generator of the present invention is inherently safer than prior art electrolyzers as it eliminates the use of corrosive electrolytes.
 (3) The compact size of the hydrogen generator enables it to be easily mounted on a vehicle to provide hydrogen fuel source to power the vehicle.
 (4) The hydrogen generator apparatus and method require only water and a voltage source to produce hydrogen fuel.
 (5) The multi-cell construction of the hydrogen generator enables operation at any voltage including higher voltages such as 12 volts, 24 volts, or 36 volts.
 (6) The voltage source can be supplied from substantially any source including a battery, solar cells, generator, or wind power.

(7) The design of the hydrogen generator provides intimate contact between the proton exchange membrane and the electrodes and avoids compression problems inherent with conventional stacked fuel cells.

(8) The hydrogen generator includes a cylindrical body and a central bladder that ensures even pressure and contact between the proton exchange membrane and the electrodes.

These and other objects and advantages of the present invention will be better understood by reading the following description along with reference to the drawings.

DESCRIPTION OF THE DRAWINGS

FIG. 9 is a plan view of a proton exchange membrane that forms a portion of the hydrogen generator of FIG. 6.

FIG. 10 is a plan view of a top and bottom gasket that forms a portion of the hydrogen generator of FIG. 6.

FIG. 11 is a side view of the top and bottom gasket of FIG. 10.

FIG. 16 is a front elevation view of an end electrode that forms a portion of the hydrogen generator in FIG. 16.

FIG. 17 is a side view of the end electrode in FIG. 17.

FIG. 18 is an end view of the end electrode in FIG. 17.

INDEX TO REFERENCE NUMERALS IN DRAWINGS

| | |
|---|---|
| 20 | hydrogen generator, first embodiment |
| 22 | cylindrical sidewall or body |
| 24 | top end plate |
| 26 | bottom end plate |
| 28 | elongated bolt |
| 30 | water inlet port |
| 32 | hydrogen outlet tube |
| 34 | positive electrical terminal |
| 36 | negative electrical terminal |
| 38 | oxygen/water outlet port |
| 40 | inflator tube |
| 42 | outer gasket |
| 44 | outer electrode |
| 46 | proton exchange membrane |
| 48 | inner electrode |
| 50 | inner gasket |
| 52 | bladder |
| 54 | interior wall or inner wall of body |
| 56 | top edge of inner gasket |
| 58 | bottom edge of inner gasket |
| 60 | side edge of inner gasket |
| 62 | inner periphery |
| 63 | opening in inner gasket |
| 64 | top edge of electrode |
| 66 | bottom edge of electrode |
| 68 | side edge of electrode |
| 70 | top edge of membrane |
| 72 | bottom edge of membrane |
| 74 | side edge of membrane |
| 75 | end gasket |
| 76 | inner periphery of end gasket |
| 78 | outer edge of end gasket |
| 80 | opening in end gasket |
| 82 | cavity |
| 84 | aperture in sidewall |
| 86 | first bore in top end plate |
| 88 | second bore in top end plate |
| 89 | non-grooved portion of inner wall |
| 90 | groove in sidewall or body |
| 91 | power source |
| 92 | oxygen storage/water accumulator |
| 93 | water pump |
| 94 | hydrogen storage tank |
| 95 | vehicle |
| 96 | radiator |
| 97 | cooling water inlet |
| 98 | cooling water outlet |
| 100 | hydrogen generator, second and preferred embodiment |
| 101 | hydrogen generating cell |
| 102 | end electrode |
| 104 | offset electrode |
| 106 | PEM membrane |
| 108 | top edge of end electrode |
| 110 | bottom edge of end electrode |
| 112 | side edge of end electrode |
| 114 | top edge of offset electrode |
| 116 | bottom edge of offset electrode |
| 118 | side edge of offset electrode |
| 120 | offset portion |
| 122 | first portion of offset electrode |
| 124 | second portion of offset electrode |
| 126 | top edge of proton exchange membrane |
| 128 | bottom edge of proton exchange membrane |
| 130 | side edge of proton exchange membrane |
| 132 | inner periphery of sidewall |
| 134 | silicone sealant |

DETAILED DESCRIPTION OF THE INVENTION

Figure 1:
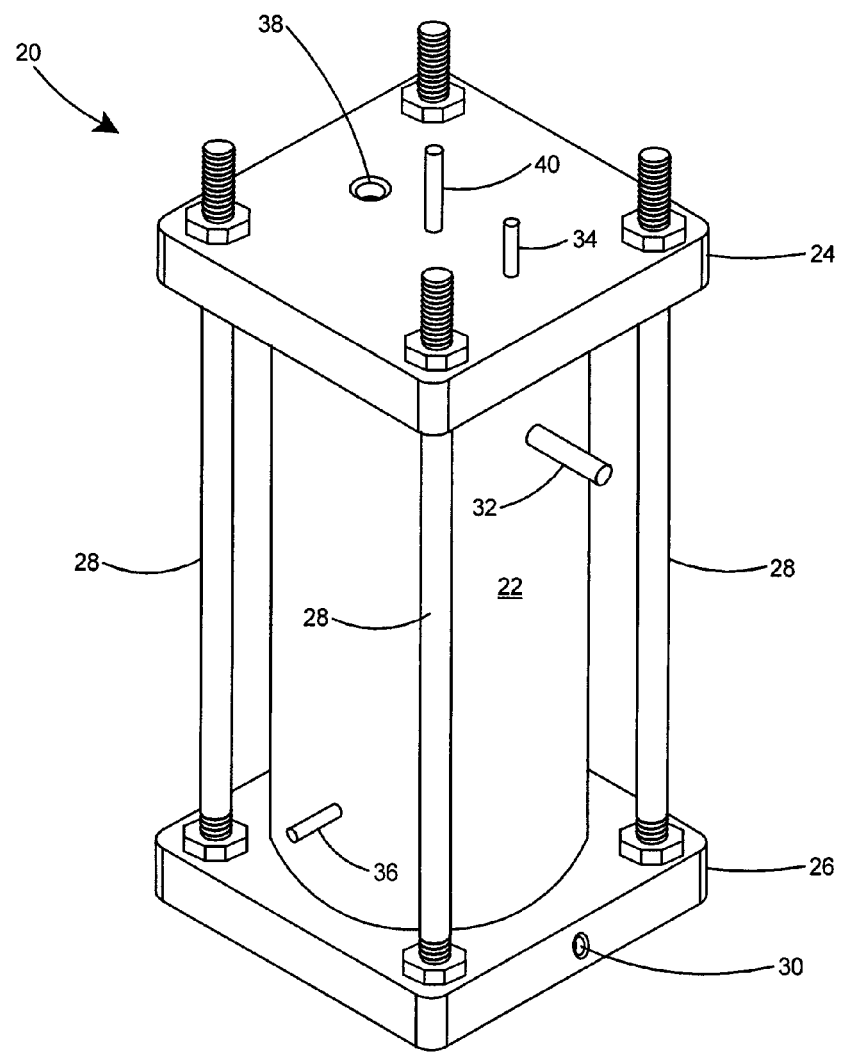
FIG. 1 is a perspective view of a first embodiment of a hydrogen generator according to the present invention.

With reference to FIG. 1 there is shown a first embodiment of a hydrogen generator 20 that includes a rigid cylindrical body or sidewall 22 with a rigid top end plate 24 and a rigid bottom end plate 26 closing off the two ends of the sidewall 22. Several elongated bolts 28 extend through the end plates 24, 26 and secure them tightly against the sidewall 22. The hydrogen generator 20 includes a water inlet port 30 in the bottom end plate 26 and a hydrogen outlet tube 32 extending from the sidewall 22. The hydrogen generator 20 includes a positive electrical terminal 34 extending through the top end plate 24 and a negative electrical terminal 36 extending through the sidewall 22. The electrical terminals 34 and 36 are preferably constructed of stainless steel or titanium. The top end plate 24 additionally includes an oxygen/water outlet 38 and an inflator tube 40 extending there from.

Figure 5:
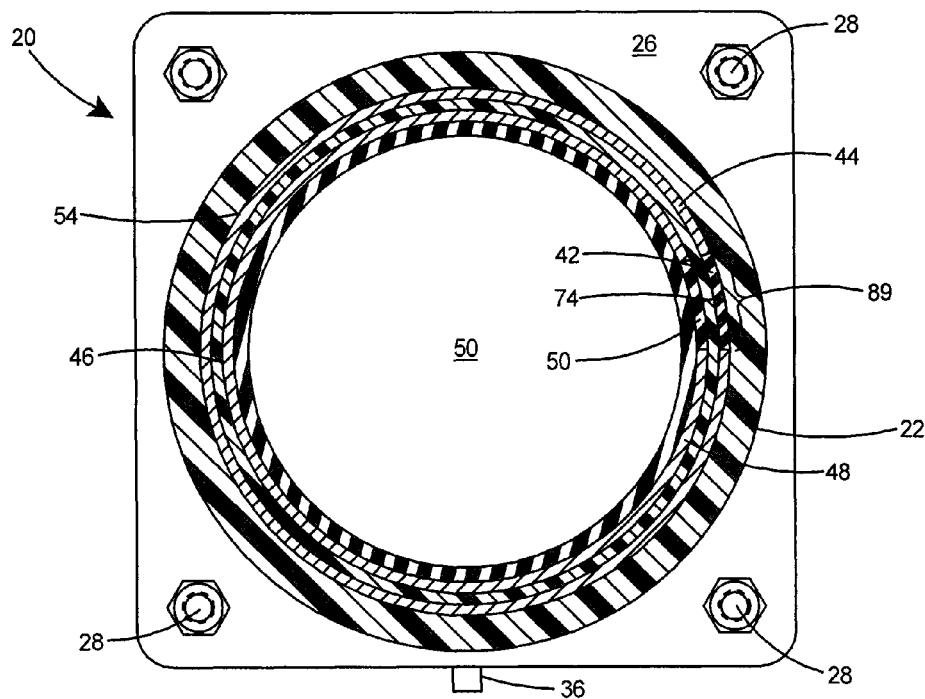
FIG. 5 is a sectional view of the hydrogen generator taken along line 5-5 of FIG. 3.

With reference to FIG. 5, the interior of the hydrogen generator 20 includes several flexible layers arranged within the sidewall 22 including an outer gasket 42, an outer electrode 44, a proton exchange membrane 46, an inner electrode 48, and an inner gasket 50. A bladder 52 is disposed within the sidewall 22 and, when inflated as shown in FIG. 5, exerts pressure against the various flexible layers and presses them into firm contact with one another and into firm engagement with the interior wall 54 of the cylindrical sidewall 22. A bladder 52 such as described herein is available from automotive suppliers such as Air Lift Company of Lansing, Mich.

Figure 7:
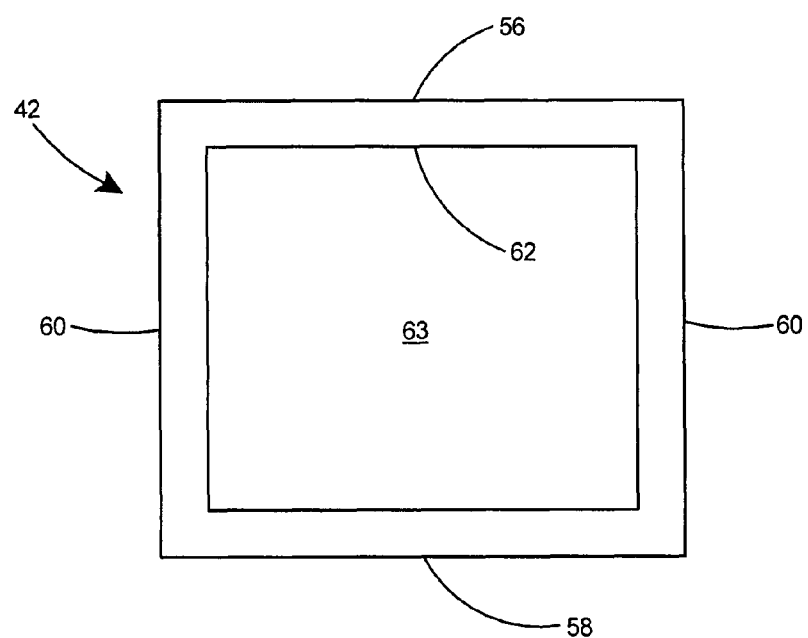
FIG. 7 is a plan view of a rubber gasket that forms a portion of the hydrogen generator of FIG. 6.

Referring to FIG. 7, the outer 42 and inner gaskets 50, of which the outer gasket 42 is shown, are formed from a sheet of elastomeric material such as natural or synthetic rubber and are stamped or cut in the shape of a picture frame shape. The outer 42 and inner gaskets 50 include a top edge 56, bottom edge 58, side edges 60, an inner periphery 62, and an opening 63 therein.

Figure 8:
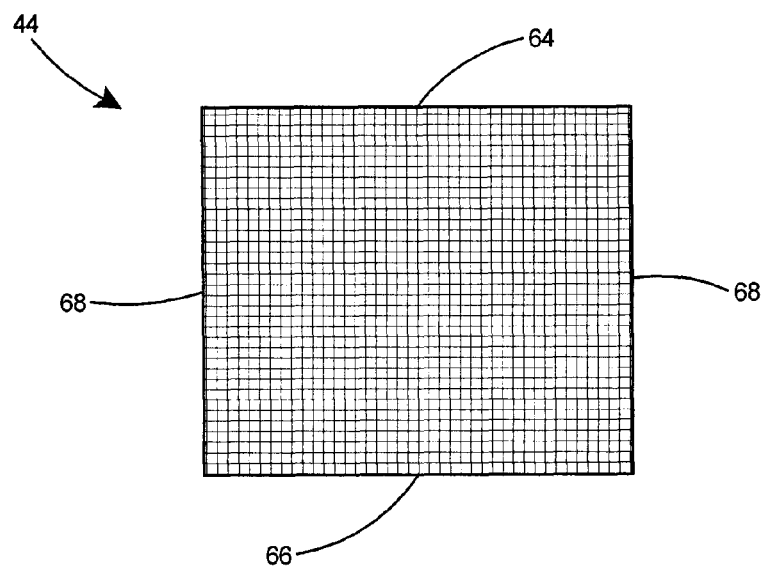
FIG. 8 is a plan view of a mesh electrode layer that forms a portion of the hydrogen generator of FIG. 6.

As shown in FIG. 8, the outer electrode 44 and inner electrode 48, of which the outer electrode 44 is shown, are cut or stamped from mesh or expanded metal sheet material in a rectangular shape and are preferably constructed of titanium mesh. Each electrode includes a top edge 64, bottom edge 66, and side edges 68. The length and width of outer 44 and inner electrodes 48 are cut to a size to fit within the opening 63 of the outer 42 and inner 50 gaskets respectively and substantially fill the inner periphery 62 of the respective gasket.

FIG. 9 depicts the proton exchange membrane 46, which is cut in a rectangular shape for use in the hydrogen generator of the present invention. The proton exchange membrane 46 is preferably a HYDRION® membrane available from Ion Power, Inc. of New Castle, Del. The HYDRION® membrane is constructed of NAFION®, a product available from DuPont of Wilmington, Del. and includes a coating of platinum and iridium catalysts. The proton exchange membrane includes a top edge 70, bottom edge 72, and side edges 74.

With reference to FIGS. 10 and 11, there is shown an end gasket 75 that forms a portion of the hydrogen generator of the present invention. The end gasket 75, two of which are used, are stamped or cut from a sheet of elastomeric material such as natural or synthetic rubber and are shaped in the form of an annulus as shown in FIG. 10. The end gasket 75 includes a circular inner periphery 76, a circular outer edge 78, and an opening 80 therein. Most preferably, the end gasket 75 is constructed of ethylene propylene di-monomer (EPDM) synthetic rubber.

Figure 12:
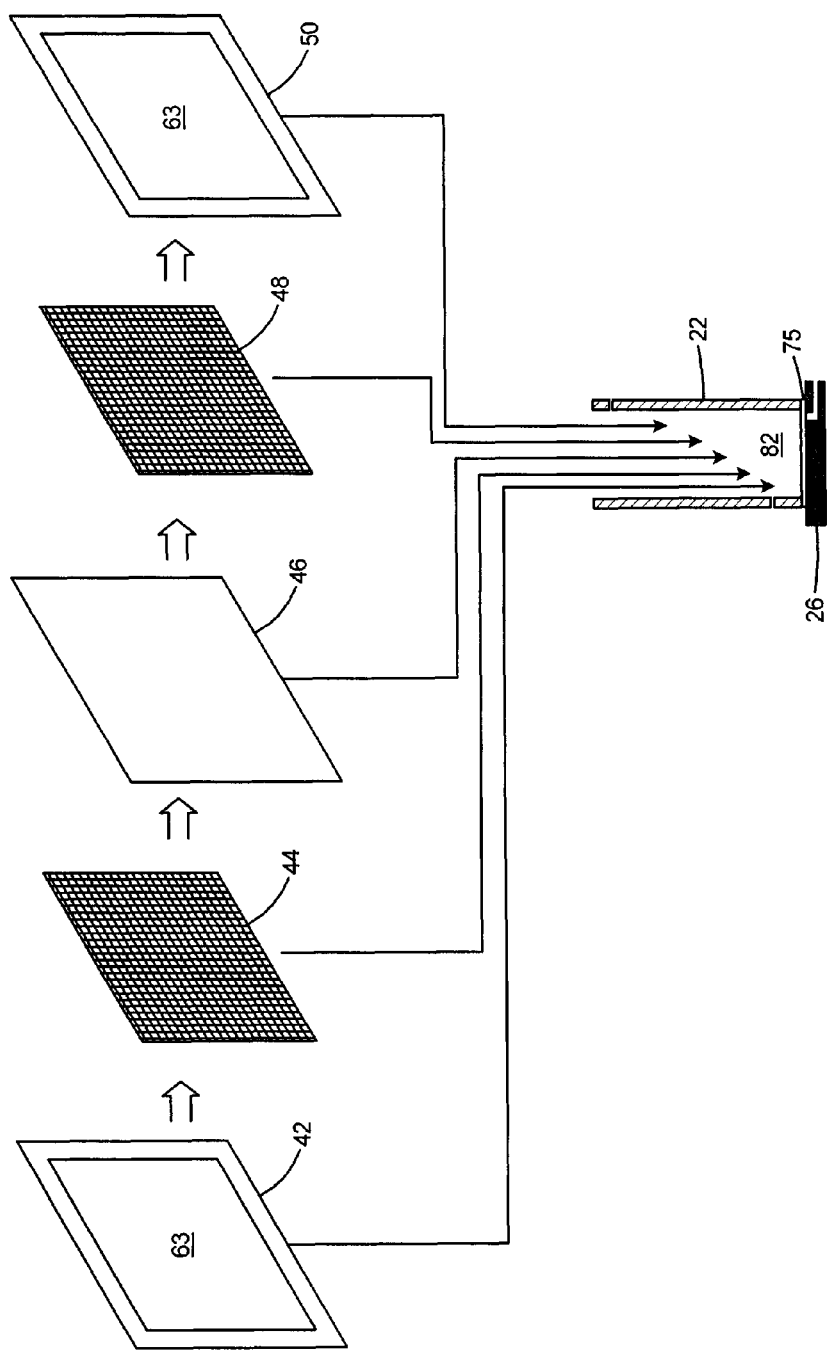
FIG. 12 is a schematic depicting the sequence and arrangement of inserting internal components in constructing the hydrogen generator of FIG. 1.

Referring to FIG. 12, the first embodiment of the hydrogen generator 20 of the present invention is constructed by providing a bottom end plate 26, an annulus-shaped end gasket 75, and a sidewall 22 as shown. The end gasket 75 is inserted on the bottom end plate 26 and the sidewall 22 placed there on. For illustration of the sequence of constructing a hydrogen generator 20 according to the present invention, some of the various internal components are depicted in their original or unbiased shape. The outer gasket 42, outer electrode 44, proton exchange membrane 46, inner electrode 48, and inner gasket 50 are each rolled into a cylindrical shape and then inserted into the cavity 82 bounded by the sidewall 22 and end plate 26. The sequence of insertion of the internal components includes inserting the outer gasket 42, the outer electrode 44, the proton exchange membrane 46, the inner electrode 48, and finally the inner gasket 50 into the cavity 82. The outer electrode 44 fits within and substantially fills the opening 63 within outer gasket 42 and the inner electrode 48 fits within and substantially fills the opening 63 within inner gasket 50.

Figure 3:
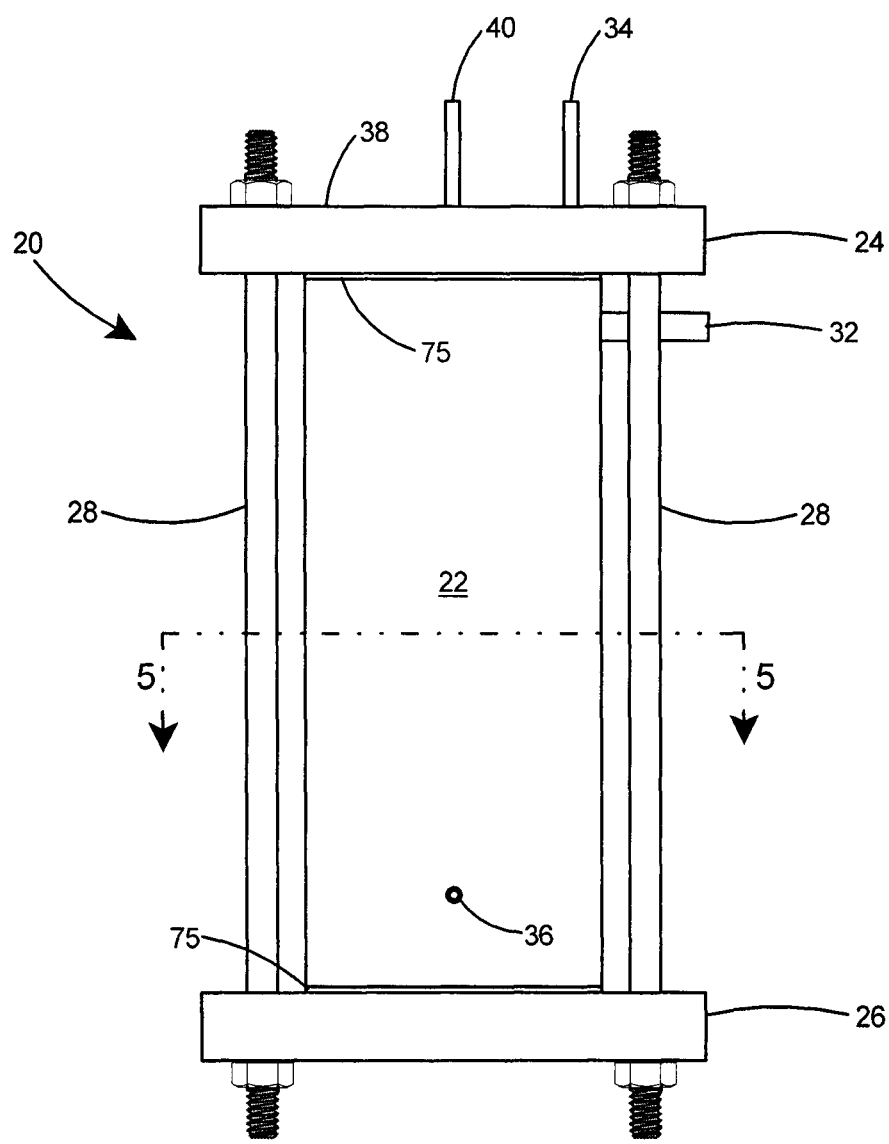
FIG. 3 is a side view of the hydrogen generator of FIG. 1.
Figure 4:
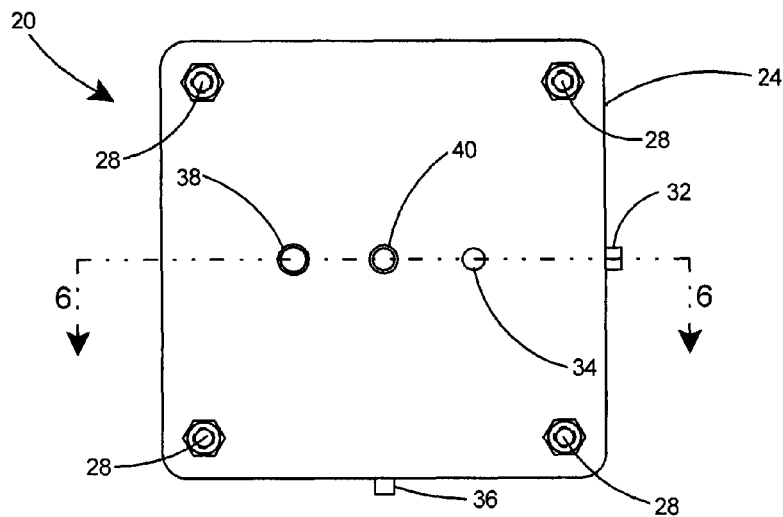
FIG. 4 is a top view of the hydrogen generator of FIG. 3.
Figure 13:
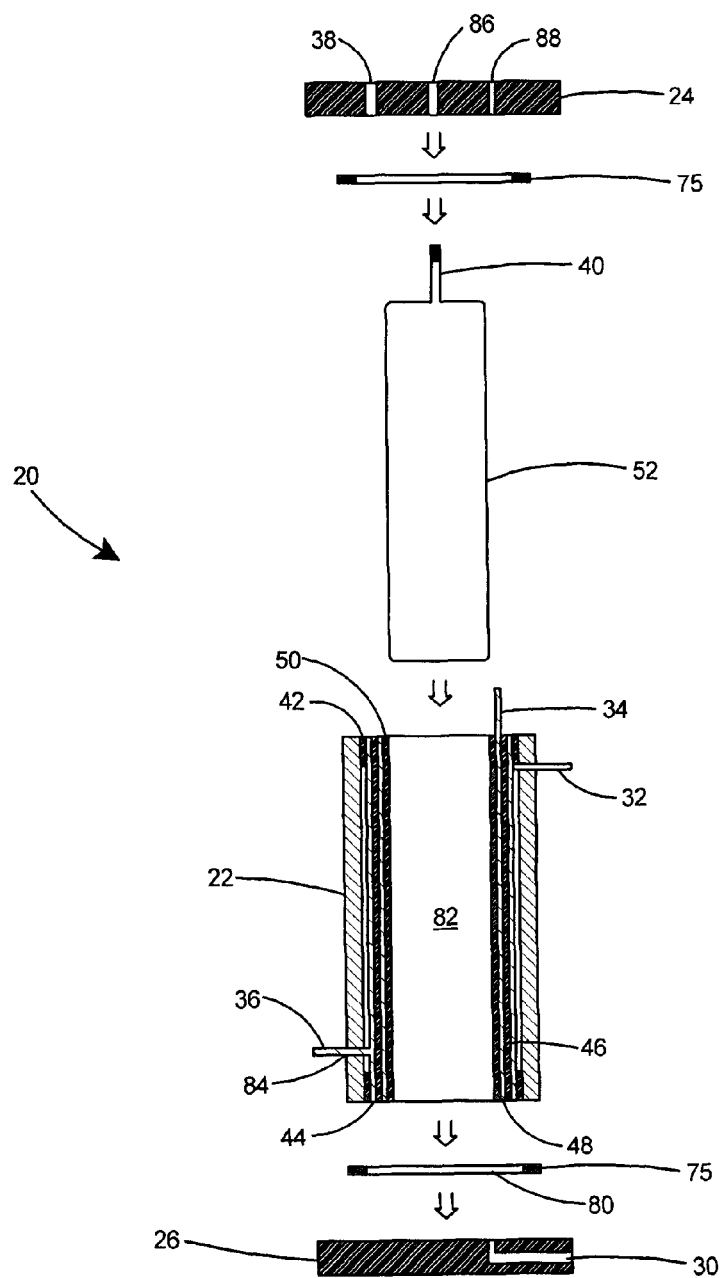
FIG. 13 is an exploded perspective view of the hydrogen generator of FIG. 1, including the internal bladder and end plates exploded away from the cylindrical body.

With reference to FIG. 13, there is shown an exploded perspective view of the hydrogen generator 20 including the internal bladder 52 and end plates 24 and 26 exploded away from the sidewall 22. Although the bottom end plate 26 and end gasket 75 are shown exploded away from the sidewall 22, as described in the previous paragraph, the bottom end plate 26 and end gasket 75 are first placed in contact with the sidewall or body 22. As the outer electrode 44 is placed in the cavity 82, the negative electrical terminal 36 is inserted through aperture 84 in the sidewall 22 and secured to the outer electrode 44 by welding, soldering or other conventional means to establish good electrical contact between the negative electrical terminal 36 and the outer electrode 44. In a similar manner, prior to inserting the inner electrode 48 into the cavity 82, positive electrical terminal 34 is secured to the inner electrode 48, by welding, soldering or other conventional means, to establish good electrical contact between positive electrical terminal 34 and the inner electrode 48. After all of the components are inserted within the cavity 82 with their bottom edges in contact with the bottom end plate 26, bladder 52 is inserted within the cavity 82. A second end gasket 75 is then inserted over the top of the cylindrical body 22. The top end plate 24, which includes a first bore 86 and second bore 88 therein, is then placed over the top of the second end gasket 75 and cylindrical body 22 in such a manner that inflator tube 40 of bladder 52 and positive electrical terminal 34 extend through the first bore 86 and second bore 88 respectively. As shown in FIG. 3, elongated bolts 28 are then secured through both end plates 24 and 26 and tightened to compress both end gaskets 75 against the top and bottom ends of the cylindrical body 22 and seal the hydrogen generator.

Figure 6:
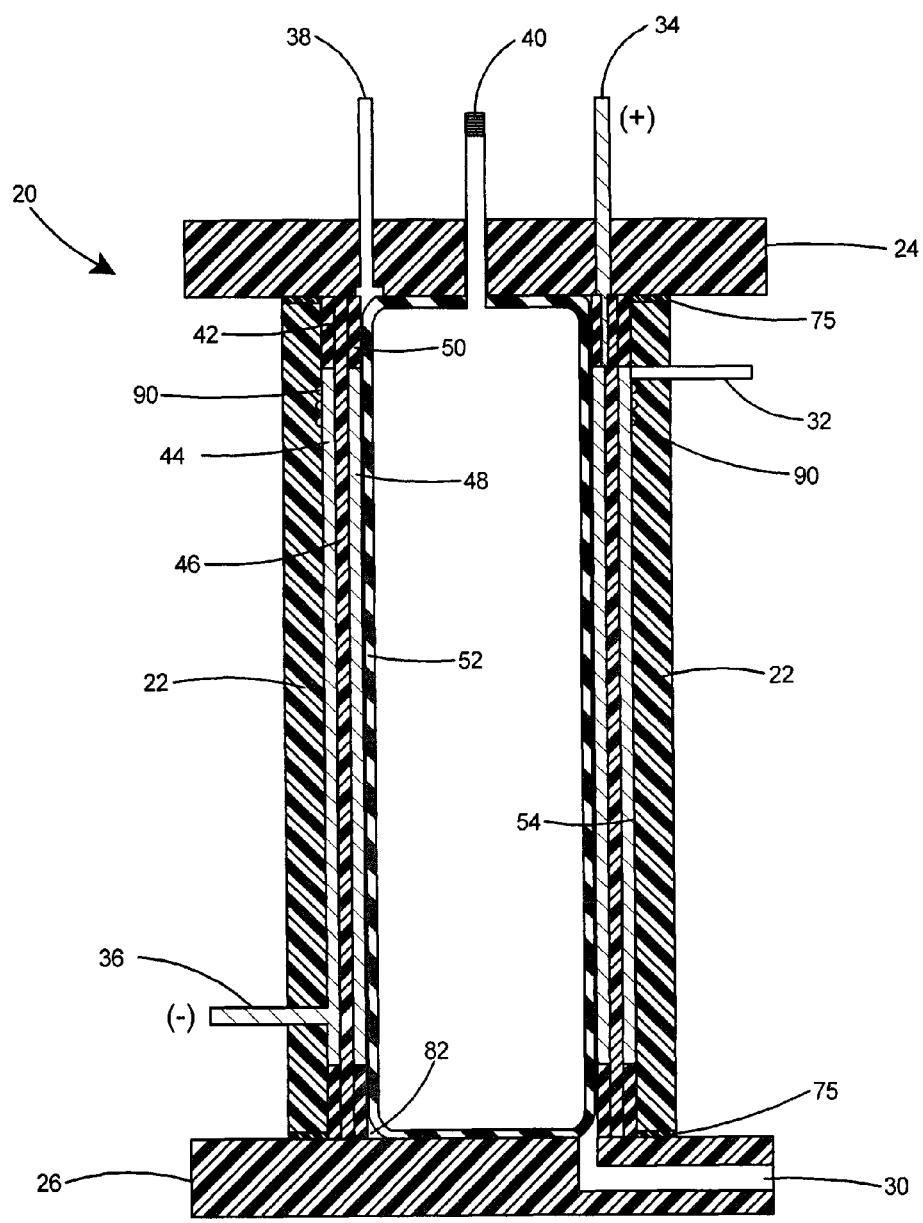
FIG. 6 is a sectional view of the hydrogen generator taken along line 6-6 of FIG. 4.

Reference is made to FIG. 6 for a description of the operation of the hydrogen generator of the present invention. For ease of explanation, FIG. 6 depicts the hydrogen generator 20 without the elongated bolts 28. In order to better illustrate the operation of the present invention, the various elements within the hydrogen generator 20, including the outer gasket 42, outer electrode 44, proton exchange membrane 46, inner electrode 48, inner gasket 50, and bladder 52 are depicted substantially thicker than actual. After all the internal components are inserted into the cavity 82 and the end plates 24 and 26 are secured, air, nitrogen, or a non-compressible fluid is introduced through inflator tube 40 to pressurize the bladder 52. The bladder 52 is pressurized until it has exerted pressure against all the surrounding components and the components are pressed tightly together and held securely against the inner wall 54 of the cylindrical body 22. Preferably, the bladder 52 is pressurized to between 50 and 100 psi. The function of the outer gasket 42 and inner gasket are to seal around the periphery of the top edges, bottom edges, and side edges of the proton exchange member 46. Thus distilled water introduced at water inlet port 30 flows around the outer surface of the bladder 52 and upward through the inner mesh electrode 48. As the distilled water flows upward in contact with the inner electrode 48, the applied voltage to electrical terminal 34 creates a positive charge on the inner side of the proton exchange membrane 46 while electrical terminal 36 creates a negative charge on the outer side of the proton exchange membrane 46. At the inner electrode or anode 48, the platinum and iridium catalyst on the proton exchange membrane 46 causes the $H_2O$ molecules to split into positive hydrogen ions ($H^+$), and negatively charged electrons. The proton exchange membrane 46 allows only the positively charged hydrogen ions to pass through it to the outer electrode or cathode 44. At the cathode the hydrogen ions combine with electrons to form hydrogen gas. Thus, in operation distilled water enters the hydrogen generator at the water inlet port 30, oxygen and water exit at the oxygen/water outlet port 38 and hydrogen exits through hydrogen outlet tube 32. As shown in FIG. 6, grooves 90 are provided around a substantial portion of the inner periphery of the cylindrical sidewall 22 in close proximity to the hydrogen outlet tube 32 to provide space for accumulating hydrogen gas and channeling it toward the hydrogen outlet tube 32. Preferably, the grooves 90 are at least 0.031 inch in depth. As shown in FIG. 5, a portion 89 of the inner wall 54 is left non-grooved to provide a smooth surface for the outer gasket 42 and inner gasket 50 to create a surface for sealing around the side edges 74 of the proton exchange membrane 26. The side edges 74 of the proton exchange membrane 26 are aligned with the non-grooved portion 89 of the inner wall 54.

Figure 2:
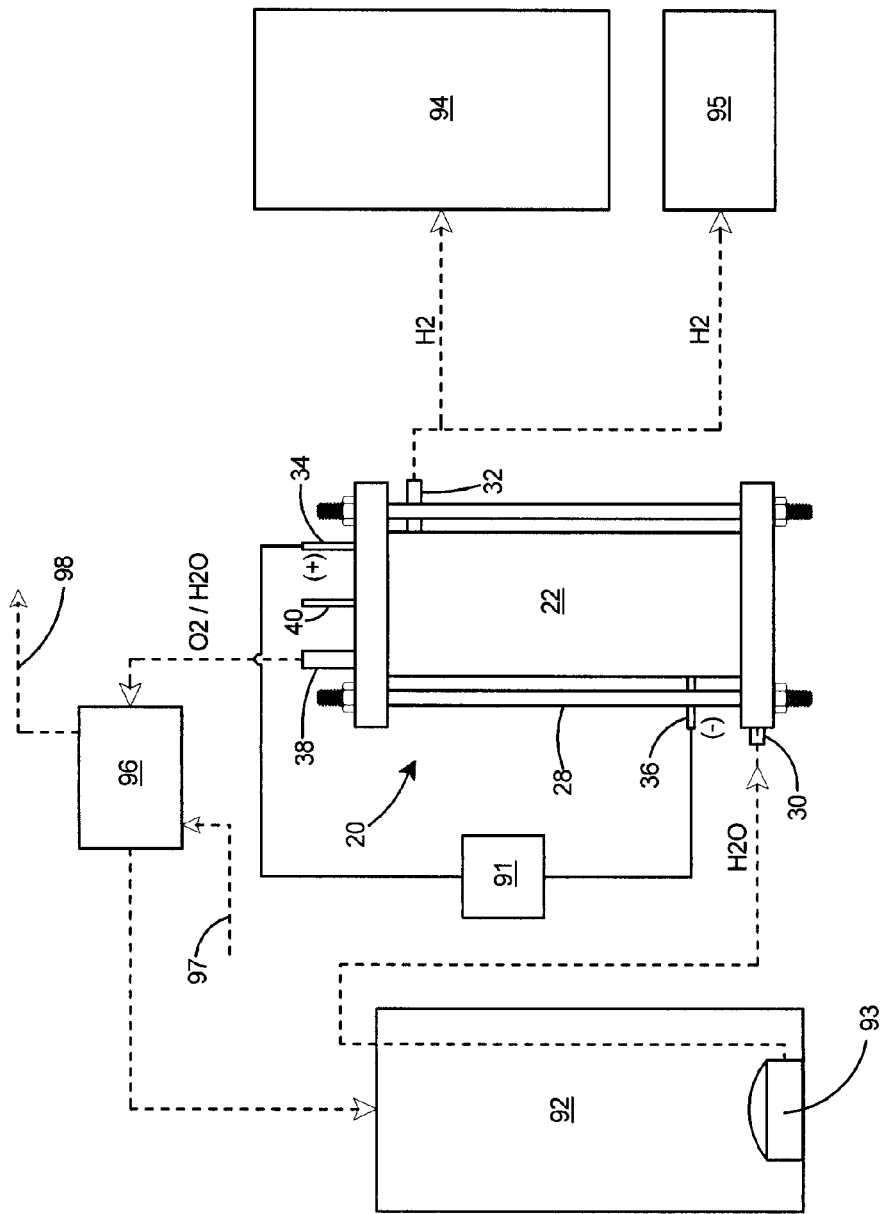
FIG. 2 is a schematic depicting a hydrogen generation system utilizing the hydrogen generator of FIG. 1.

With reference to FIG. 2 there is shown a schematic depicting a hydrogen generation system utilizing the hydrogen generator of the present invention. In the hydrogen generator 20, distilled water is fed into water inlet port 30 and a power source 91 is connected to electrical terminals 34 and 36. The power source 91 is preferably DC voltage and can be provided by a battery or solar panel (not shown). The voltage applied to the electrical terminals 34 and 36 is preferably between 1.5 and 2.0 volts. A voltage in this range enables the proton exchange membrane to operate at a high efficiency and produce approximately 7.5 liters per minute of hydrogen from a proton exchange membrane with an area of 80 square inches. Distilled water is stored in an oxygen storage/water accumulator tank 92 and a pump 93 propels the distilled water to the generator 20. Inside the hydrogen generator 20 electricity and water are combined to create oxygen and hydrogen. Hydrogen exits the generator 20 through hydrogen outlet tube 32 and oxygen and water exit through the oxygen/water outlet port 38. The hydrogen can be accumulated in a hydrogen storage tank 94 or be sent to the fuel feed of an internal combustion engine in a vehicle 95 as shown. The oxygen and water exit the hydrogen generator 20 at oxygen/water outlet port 38 and are cooled in a radiator 96 that includes a cooling water inlet 97 and cooling water outlet 98.

Figure 14:
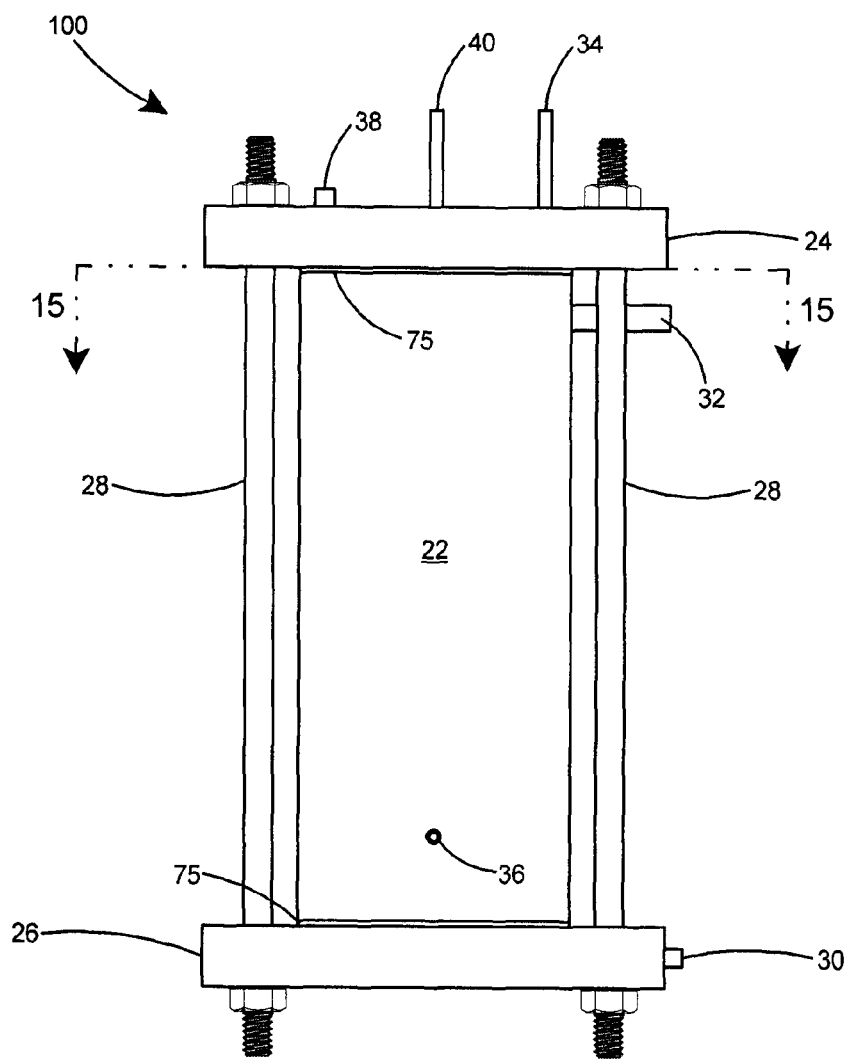
FIG. 14 is a side view of a second and preferred embodiment of the hydrogen generator according to the present invention.

With reference to FIG. 14 there is shown a second and preferred embodiment of a hydrogen generator 100 that, similar to the first embodiment, includes a rigid cylindrical body or sidewall 22, a rigid top end plate 24 and a rigid bottom end plate 26 closing off the two ends of the sidewall 22, and elongated bolts 28 extending through the end plates 24 thereby securing them tightly against the sidewall 22. As in the first embodiment, the hydrogen generator 100 includes a water inlet port 30 in the bottom end plate 26, a hydrogen outlet tube 32 extending from the sidewall 22, a positive electrical terminal 34 extending through the top end plate 24, and a negative electrical terminal 36 extending through the sidewall 22. The electrical terminals 34 and 36 are preferably constructed of stainless steel or titanium. The top end plate 24 additionally includes an oxygen/water outlet 38 and an inflator tube 40 extending there from.

Figure 15:
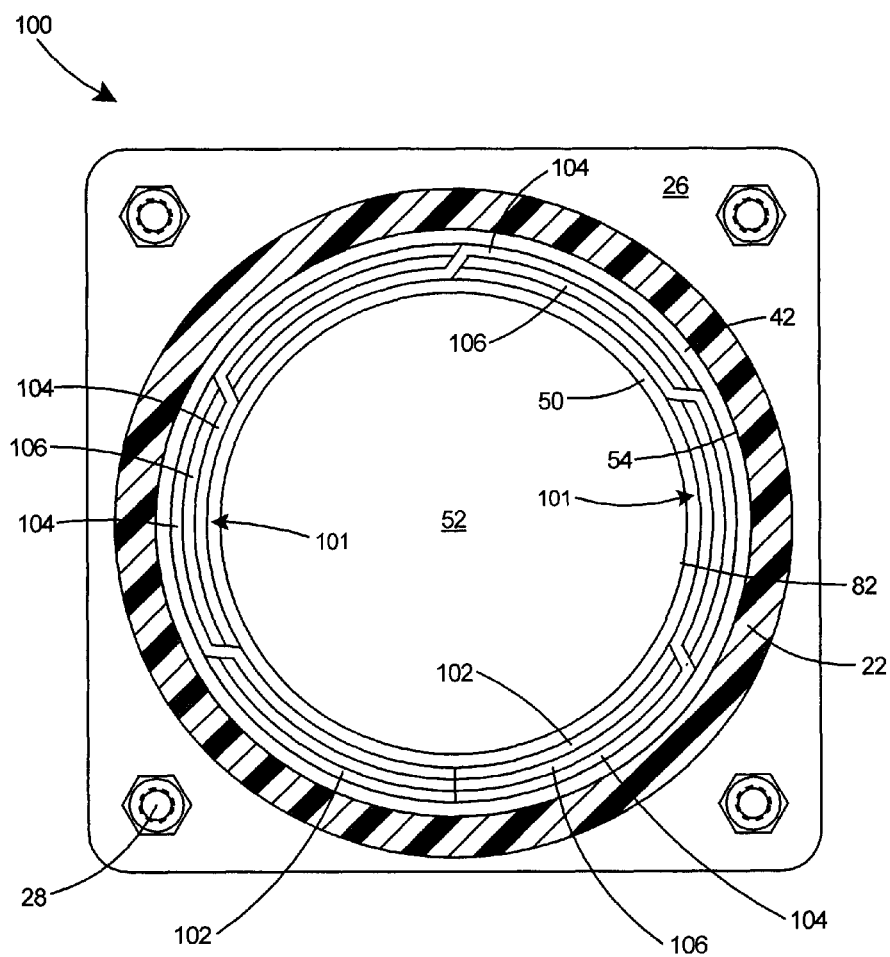
FIG. 15 is a sectional view of the hydrogen generator taken along lines 15-15 of FIG. 14.

With reference to FIG. 15, the interior of the hydrogen generator 100 includes substantially the same elements as contained in the first embodiment, but the difference being that instead of a single PEM membrane, a single outer electrode, and a single inner electrode, the preferred embodiment of the hydrogen generator 100 includes a plurality of PEM membranes and a plurality of electrodes that have provided unexpected beneficial results in that the hydrogen generator 100 can be operated at a higher voltage than the 1.5 to 2.0 volts achieved by the first embodiment. The proton exchange membranes have a voltage limitation of 2.0 volts, and as a result, the first embodiment of the hydrogen generator, having a single PEM, was limited to a maximum voltage of 2.0 volts. In the preferred embodiment shown herein, the PEM membranes and electrodes are divided into six separate hydrogen generating cells 101 to enable the hydrogen generator 100 to operate at 12 volts. By operating at 12 volts, the hydrogen generator 100 is rendered very useful for operation in a great many vehicles, which a great many vehicles are designed to run at 12 volts. Thus the preferred embodiment of the hydrogen generator 100 according to the present invention greatly increases its versatility and usefulness.

As shown in FIG. 15, a top view of the hydrogen generator viewing down from just below the top end plate and depicting the internal components, the hydrogen generator 100 includes two end electrodes 102, a plurality of offset electrodes 104, and a plurality of PEM membranes 106. As in the first embodiment, an outer gasket 42 is included against the cylindrical sidewall 22 outward of the membranes and electrodes and an inner gasket 50 is included against the bladder 52 inward of the membranes and electrodes.

With reference to FIGS. 16-18, the end electrodes 102 are preferably cut or stamped from mesh or expanded metal sheet material in a substantially rectangular shape and are preferably constructed of titanium. Each end electrode 102 includes a top edge 108, bottom edge 110, and side edges 112. The length of the end electrodes 102 are cut to a size to enable the top and bottom edges 108 and 110 to fit against the outer and inner gaskets in the assembled hydrogen generator. A curve, as shown in FIG. 18, is rolled into each end electrode 102 to enable the end electrodes to substantially match the curve of the sidewall of the preferred embodiment of the hydrogen generator 100.

Figures 19, 20:
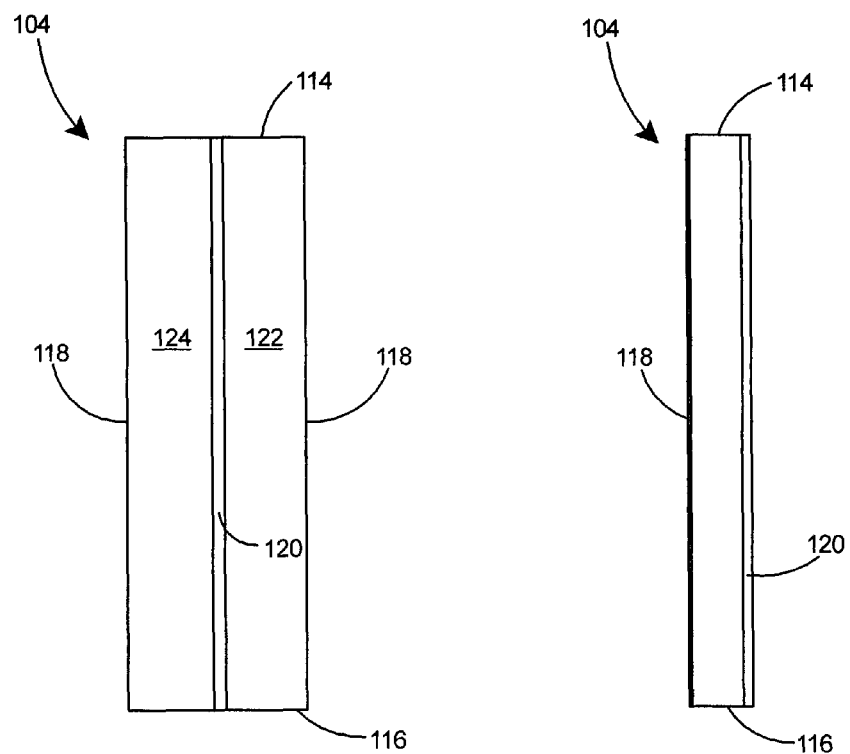
FIG. 19 is a front elevation view of an offset electrode that forms a portion of the hydrogen generator in FIG. 16.
FIG. 20 is a side view of the offset electrode in FIG. 20.
Figure 21:
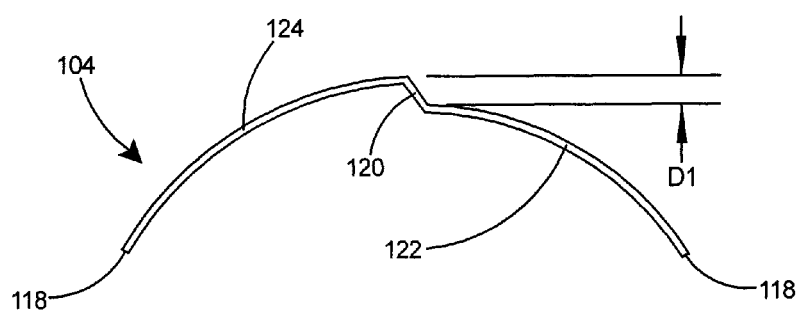
FIG. 21 is an end view of the offset electrode in FIG. 20.

With reference to FIGS. 19-21, the offset electrodes 104 are also preferably cut or stamped from mesh or expanded metal sheet material in a substantially rectangular shape and are preferably constructed of titanium. Each offset electrode 104 includes a top edge 114, bottom edge 116, and side edges 118. The length of the offset electrodes 104 are cut to a size to enable the top and bottom edges 114 and 116 to fit against the outer and inner gaskets in the assembled hydrogen generator. As shown in FIG. 21, each offset electrode 104 is rolled or formed into a curved shape from side to side to enable the offset electrodes to substantially match or conform to the curve of the sidewall of the hydrogen generator. The width of each offset electrode 104 is approximately twice the width of each end electrode. Each offset electrode 104 also includes an offset portion 120 formed into the electrode as shown in FIG. 21. The offset portion 120 delineates a first portion 122 and second portion 124 of the offset electrode 104 with an offset between, shown as distance D1 in FIG. 21, for reasons that will be made apparent with explanations hereinafter of the assembly details of the preferred embodiment of the hydrogen generator 100. Preferably, the first portion 122 and the second portion 124 of the offset electrodes 104 are offset from one another by a distance of 0.015 to 0.035 inch.

Figure 22:
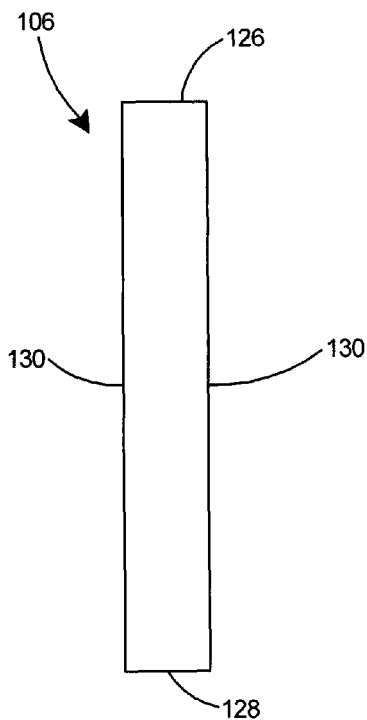
FIG. 22 is a front elevation view of a proton exchange membrane (PEM) that forms a portion of the hydrogen generator in FIG. 16.
Figure 23:
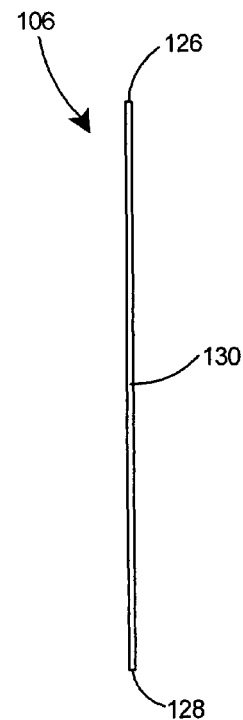
FIG. 23 is a side view of the PEM in FIG. 23.
Figure 24:
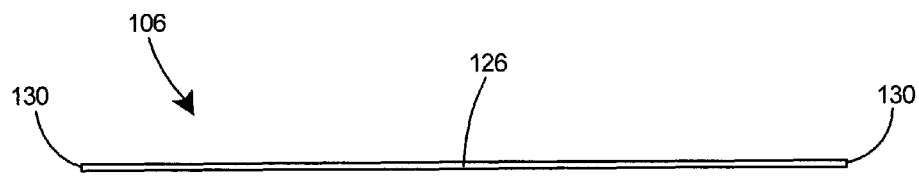
FIG. 24 is an end view of the PEM in FIG. 23.

Referring to FIGS. 22-24, the proton exchange membranes (PEM) 106 are cut in a substantially rectangular shape and are preferably constructed of HYDRION® membrane material available from Ion Power, Inc. of New Castle, Del. The proton exchange membranes 106 include a top edge 126, bottom edge 128, and side edges 130. The proton exchange membranes 106 are substantially thin membranes that are flexible and will flex to substantially match the curve of the sidewall of the preferred embodiment of the hydrogen generator 100.

Figure 25:
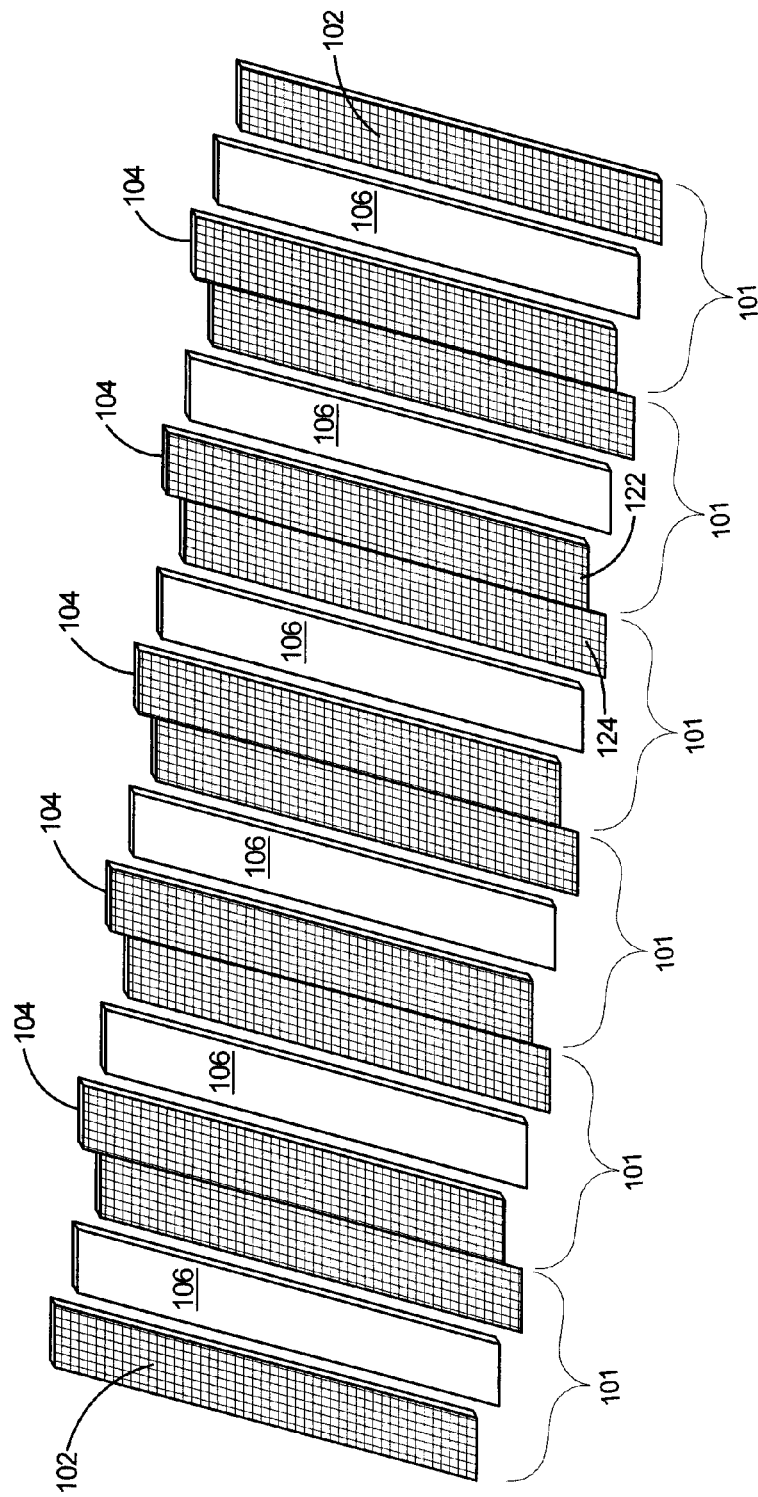
FIG. 25 is a conceptual view depicting a linear alignment of the internal components of the second embodiment of the hydrogen generator to illustrate the arrangement of the internal components within the hydrogen generator.

With reference to FIG. 25, after the end electrodes 102 and offset electrodes 104 are formed into a cured shape from side to side, the internal components of the preferred embodiment of the hydrogen generator 100 are aligned sequentially along the inner curved wall of the cylindrical sidewall (not shown) in the order depicted in FIG. 25. The components are arranged such that each proton exchange membrane 106 is aligned between two electrodes. On each end of the sequence, the PEM 106 is aligned between an end electrode 102 and an offset electrode 104. Each of the four proton exchange membranes 106 on the interior of the sequence is aligned between the first portion 122 of one offset electrode 104 and the second portion 124 of the adjacent offset electrode 124. The internal components of the hydrogen generator are aligned such that each first portion 122 of the offset electrode 104 will be located between a proton exchange membrane 106 and the sidewall of the hydrogen generator 100 and each second portion 124 of the offset electrode 104 will be located on the inner side of the proton exchange membrane 106 toward the inner cavity. In the final assembly, each PEM 106 will be sandwiched between two electrodes and each such sandwich structure will define a hydrogen generating cell 101, of which six cells 101 are depicted in FIG. 25.

Figure 26:
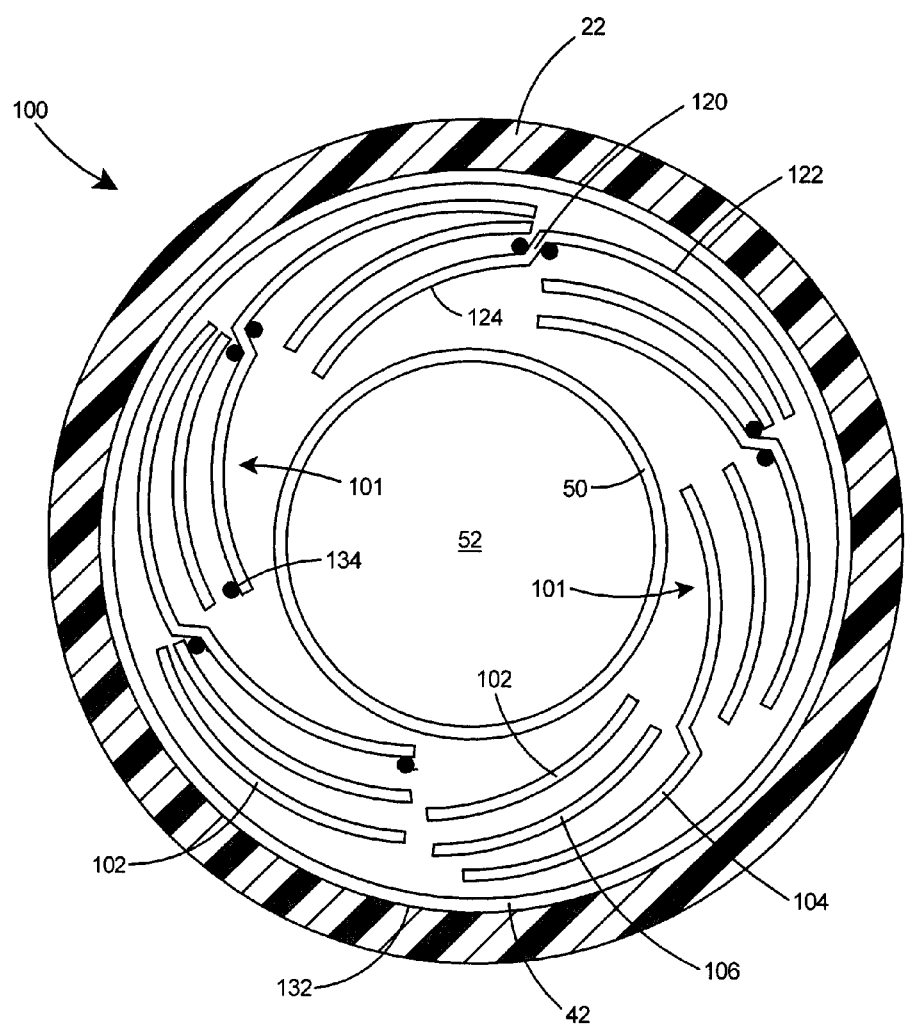
FIG. 26 is an exploded view of the hydrogen generator taken along lines 15-15 of FIG. 14 and depicting the internal components exploded away from the cylindrical sidewall.

With reference to FIG. 26, the arrangement of the internal components around the inner periphery 132 of the sidewall 22 include the outer gasket 42, two end electrodes 102, five offset electrodes 104, six proton exchange membranes 106, and an inner gasket 50. A bead of silicone sealant 134 is applied to opposite sides of the offset portion 120 of each offset electrode 104 to seal the edges of each hydrogen generating cell 101 to its surrounding electrodes and also to direct hydrogen to the hydrogen outlet. By splitting the large proton exchange membrane of the first embodiment of the hydrogen generator into six smaller proton exchange membranes 106, and applying a negative 12 volts to one end electrode 102 and a positive 12 volts to the opposite end electrode 102, the various proton exchange membranes 106 will be wired in series and will function as six separate cells 101 within the hydrogen generator. In the first embodiment of the hydrogen generator described herein, the applied voltage across the single PEM was limited to 1.5 to 2.0 volts as a result of a voltage potential limitation on the membrane. In the preferred embodiment of the hydrogen generator 100, operating the generator with six separate cells 101 enables running the generator at 12 volts while limiting the potential on each proton exchange membrane to 2 volts as a result of running the six cells in series, thus protecting the proton exchange membranes from damage and failure by a voltage overload.

Referring to FIG. 15, after the internal components including the outer gasket 42, two end electrodes 102, five offset electrodes 104, six proton exchange membranes 106, and inner gasket 50 are arranged within the inner cavity 82 formed by the sidewall 22, a bladder 52 is inserted within the inner cavity 82 and inflated. The inflated bladder 52 exerts pressure against the various aligned components and presses them into firm contact with one another and into firm engagement with the interior wall 54 of the cylindrical sidewall 22. In order for the 12 volt potential applied to the end electrodes 102 to efficiently generate hydrogen at each PEM 106, it is critical that the bladder be pressurized sufficiently to force each electrode 102 and 104 into complete physical contact with the side of the proton exchange membrane 106 that it is in contact with.

With reference to FIGS. 14 and 15, the hydrogen generator 100 is operated by applying a DC voltage of opposite polarity to each electrical terminal 34 and 36 (see FIG. 14) while pumping water into the water inlet port 30. With the hydrogen generator 100 fully assembled and the bladder 52 pressurized, a DC voltage of opposite polarity applied to each end electrode 102 will cause current to flow in series through the six cells 101 and the series operation will limit the maximum voltage across each PEM 106 to 2.0 volts. Operated in this manner, hydrogen molecules are transferred to the outer side of each membrane 106 and then to the hydrogen outlet tube 32. Each HYDRION® membrane with the platinum and iridium catalysts coated thereon enables transfer of hydrogen molecules through the membrane as the voltage is applied thereto.

Although a specific embodiment and operation of a hydrogen generator 100 is depicted herein with 6 cells 101, it should be understood that other arrangements are possible, such as 12 cells to form a hydrogen generator that will operate at 24 volts, 18 cells to form a hydrogen generator that will operate at 36 volts. Any desired operating voltage can be achieved by varying the amount of cells. It should also be understood that the diameter of the sidewall can be increased in order to accommodate additional cells. Although the preferred embodiment is depicted herein with a circular sidewall, it should be understood that sidewalls of other shapes are considered within the scope of invention and can be achieved by providing an appropriately shaped bladder to apply even pressure against the cells and the sidewall.

The sidewall or body 22 of a hydrogen generator according to the present invention is preferably constructed of plastic or metal. Suitable plastics for constructing the body 22 include polypropylene, polyethylene, polyvinyl chloride (PVC), acrylonitrile-butadiene styrene (ABS), and polycarbonate. Suitable metals include aluminum, stainless steel, and rust-free or rust-inhibiting alloys. Most preferably the body 22 is formed of clear polyvinyl chloride. The end plates 24 and 26 are preferably constructed of a material that is an electrical insulator. More preferably the end plates 24 and 26 are constructed of plastic. Suitable plastics include polypropylene, polyethylene, polyvinyl chloride (PVC), acrylonitrile-butadiene styrene (ABS), and polycarbonate. Most preferably the end plates 24 and 26 are constructed of polycarbonate. As a specific example, the cylindrical body 22 may be formed from a 10-inch long piece of 4-inch Schedule 80 PVC pipe.

Most preferably the electrodes, including outer electrode 44 and inner electrode 48 of the first embodiment and end electrode 102 and offset electrode 104 of the second embodiment, are constructed of titanium mesh. The positive electrical terminal 34 and negative electrical terminal 36 are preferably constructed of titanium or stainless steel. Most preferably, the outer gasket 42 and inner gasket 50 are constructed of ethylene propylene di-monomer (EPDM) rubber, although other synthetic rubbers such as acrylonitrile and styrene-butadiene are acceptable.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:
1. A hydrogen generator comprising:
a sidewall including an inner wall and two ends;

a first end plate and a second end plate secured against said ends of said sidewall and defining a closed body with a cavity therein;

said cavity including a plurality of hydrogen generating cells therein extending sequentially around said inner wall of said body;

each of said cells including a proton exchange membrane sandwiched between two electrodes;

a bladder disposed and inflated within said cavity inward of said cells, said inflated bladder thereby compressing said electrodes in each of said cells into intimate contact with said proton exchange membrane and with said inner wall of said sidewall;

an electrical terminal secured to an electrode at each end of said sequence of cells and extending through said body;

a DC voltage of opposing polarities applied to each of said terminals thereby enabling electrical current to flow in series through each of said cells; and a water inlet port, an oxygen and water outlet port, and a hydrogen outlet port extending from said inner cavity through said closed body.

2. The hydrogen generator of claim 1 wherein said cavity includes six of said cells and said DC voltage is 12 volts.

3. The hydrogen generator of claim 1 wherein
said electrodes include end electrodes and offset electrodes; and
said end electrodes and said offset electrodes are substantially rectangular in shape.

4. The hydrogen generator of claim 3 wherein
said offset electrodes include a top edge, bottom edge, and side edges; and
an offset portion extending longitudinally through said offset electrode between said side edges; and
said offset portion dividing said offset electrode into a first portion and a second portion.

5. The hydrogen generator of claim 4 wherein said first portion and said second portion of said offset electrodes are offset from one another by 0.015 to 0.035 inch.

6. The hydrogen generator of claim 1 wherein
said sidewall is substantially circular; and
said electrodes are curved to conform substantially to the shape of said inner wall of said circular sidewall.

7. The hydrogen generator of claim 1 including
an inner gasket disposed between said bladder and each of said cells;
an outer gasket disposed between said inner wall of said body and each of said cells; and
said outer gasket and said inner gasket are formed from a flat elastomeric sheet in the shape of a picture frame and are formed into a cylindrical shape for insertion into said cavity.

8. The hydrogen generator of claim 1 wherein
said electrodes are electrically conductive; and
said electrodes are formed from metal mesh.

9. The hydrogen generator of claim 1 wherein said proton exchange membranes are rectangular shaped.

10. The hydrogen generator of claim 9 wherein said proton exchange membranes are HYDRION® membranes including a NAFION® base member with a coating of platinum and iridium catalysts.

11. The hydrogen generator of claim 7 wherein the material of construction of said outer gasket and said inner gasket is ethylene propylene di-monomer.

12. The hydrogen generator of claim 1 wherein said electrodes are formed of titanium mesh.

13. The hydrogen generator of claim 1 wherein said first end plate and said second end plate are formed of material that is an electrical insulator.

14. The hydrogen generator of claim 1 wherein
said inner wall of said body includes grooves therein extending around a portion of the circumference of said inner wall; and
said grooves are in close proximity to said hydrogen outlet port.

15. The hydrogen generator of claim 1 including an annulus shaped end gasket disposed between each of said end plates and said body.

16. The hydrogen generator of claim 1 including
a fastening arrangement for securing said end plates to said sidewall; and
said fastening arrangement including a plurality of elongated bolts extending through said end plates.

17. The hydrogen generator of claim 1 wherein the material of construction of said sidewall is selected from the group including polypropylene, polyethylene, polyvinyl chloride (PVC), acrylonitrile-butadiene styrene (ABS), polycarbonate, and metal.

18. The hydrogen generator of claim 17 wherein
said sidewall is constructed of polyvinyl chloride; and
said end plates are constructed of polycarbonate.

19. The hydrogen generator of claim 15 wherein the material of construction of said end gaskets is ethylene propylene di-monomer.

20. A method of producing hydrogen including:
providing a sidewall with an inner wall and two ends, two end plates, and a fastening arrangement for securing said end plates at said ends of said sidewall and thereby forming a closed body with a cavity therein;
inserting within said cavity sequentially along said inner wall a plurality of hydrogen generating cells with each of said hydrogen generating cells including a proton exchange membrane sandwiched between two electrodes;
inserting within said cavity a bladder inward of said cells;
inflating said bladder thereby compressing said electrodes in each of said cells into intimate contact with said proton exchange membrane and with said inner wall of said sidewall;
securing an electrical terminal at each end of said sequence of cells and extending an end of said electrical terminals through said body;
providing a water inlet port, an oxygen and water outlet port, and a hydrogen outlet port extending from said inner cavity through said closed body;
connecting a DC voltage of opposite polarities to said electrical terminals thereby establishing electrical current flowing in series through each of said cells; and
pumping water into said water inlet port thereby creating hydrogen gas exiting said hydrogen generator at said hydrogen outlet port.

* * * * *